United States Patent [19]
Osieka et al.

[11] 3,742,007
[45] June 26, 1973

[54] N-ALKYL-N-BI-, TRI- OR TETRACYCLOALKYL THIOCARBAMATES

[75] Inventors: Hans Osieka, Ludwigshafen; Hans Kiefer, Wachenheim; Adolf Fischer, Mutterstadt, all of Germany

[73] Assignee: Badische Anilin- & Soda-Fabrik Aktiengesellschaft, Ludwigshafen am Rhine, Germany

[22] Filed: Oct. 19, 1970

[21] Appl. No.: 82,145

[30] Foreign Application Priority Data
Oct. 23, 1969 Germany............... P 19 53 262.8

[52] U.S. Cl............... 260/455 A, 71/100, 71/101
[51] Int. Cl.................. C07c 155/02, C07c 155/08
[58] Field of Search................ 260/455 A; 71/100, 71/101

[56] References Cited

UNITED STATES PATENTS

| 3,476,791 | 11/1969 | Newman et al. | 260/455 A |
| 3,347,658 | 10/1967 | Luckenbaugh | 71/119 |
| 3,551,477 | 12/1970 | Koenig et al. | 260/455 A |
| 3,318,947 | 5/1967 | Speziale et al. | 71/119 |
| 2,983,747 | 5/1961 | Campbell et al. | 260/455 A |

Primary Examiner—Lewis Gotts
Assistant Examiner—G. Hollrah
Attorney—Johnston, Root, O'Keeffe, Keil, Thompson & Shurtleff

[57] ABSTRACT

New and valuable substituted thiolcarbamates having a good herbicidal action and a process for controlling the growth of unwanted plants with these compounds.

9 Claims, No Drawings

N-ALKYL-N-BI-, TRI- OR TETRACYCLOALKYL THIOCARBAMATES

The present invention relates to thiocarbamates and herbicides containing these active ingredients.

It is known to use ethyl-N-cyclohexyl-N-ethylthiolcarbamate as a herbicide; however, results obtained with this active ingredient are in many cases unsatisfactory.

We have found that thiolcarbamates of the formula

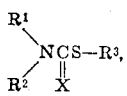

where $R^1$ denotes lower alkyl (methyl, ethyl, propyl, isopropyl, butyl, isobutyl, sec-butyl, tert-butyl), $R^2$ denotes bicycloalkyl, tricycloalkyl or tetracycloalkyl having 7 to 12 carbon atoms ( bicyclo-[2,2,1]-heptyl, methylbicyclo-[2,2,1]-heptyl, bicyclo-[3,3,0]-octyl, bicyclo-[2,2,2]-octyl, bicyclo-[3,2,1]-octyl, bicyclo-[4,3,0]-nonyl, bicyclo-[3,3,1]-nonyl, tricyclo-[5,2,1,0$^{2,6}$]-decyl, tricyclo-[6,2,1,0$^{2,7}$]-undecyl, tetracyclo-[6,2,1,1$^{3,6}$0$^{2,7}$]-dodecyl), $R^3$ denotes lower alkyl (methyl, ethyl, propyl, isopropyl, butyl, isobutyl, secbutyl, tert-butyl) which may be substituted by chlorine or $R^3$ denotes lower alkenyl (allyl, methallyl, dichlorallyl, trichlorallyl, dichloromethallyl) which may be substituted by chlorine, and X denotes oxygen or sulfur, have a good herbicidal action.

This good action is particularly in evidence in the control of unwanted plants in crop plants, e.g., sugar beet.

The active ingredients may be prepared by reacting cycloalkylamines with alkylthiol chloroformates in the presence of acid-binding agents. The preparation of the active ingredients is illustrated below with reference to ethyl-N-ethyl-N-bicyclo-[2,2,1]-heptylthiolcarbamate:

13.9 parts by weight of ethylbicyclo-[2,2,1]-heptylamine and 10.1 parts by weight of triethylamine are dissolved in 50 parts by weight of acetone; at room temperature, 12.5 parts by weight of ethylthiol chloroformate is added to the solution. The mixture is stirred for 30 minutes and allowed to cool. The precipitated triethylamine hydrochloride is suction filtered, the filtrate is concentrated in vacuo and distilled. Ethyl-N-ethyl-N-bicyclo-[2,2,1]-heptylthiolcarbamate having a boiling point at 0.1 mm of 94° C is obtained in a 95 percent yield. $n_D^{25}$: 1.5225.

The structural formula of the substance is as follows:

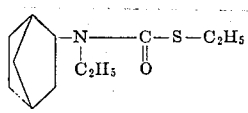

The other active ingredients may be prepared in a similar manner, e.g., ethyl-N-ethyl-N-tricyclo-[5,2,1,0$^{2,6}$]-decylthiolcarbamate of the formula

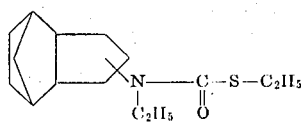

b.p. (0.1 mm): 131° – 133°C, $n_D^{25}$: 1.5340;
methyl-N-ethyl-N-bicyclo-[3,3,0]-octylthiolcarbamate,
b.p. (0.1 mm): 100° – 102° C, $n_D^{25}$: 1.5272;
ethyl-N-ethyl-N-bicyclo-[3,3,0]-octylthiolcarbamate,
b.p. (0.1 mm): 142° – 145° C, $n_D^{25}$: 1.5213;
n-propyl-N-ethyl-N-bicyclo-[3,3,0]-octylthiolcarbamate,
b.p. (0.4 mm): 133°C, $n_D^{25}$: 1.5176;
isopropyl-N-ethyl-N-bicyclo-[3,3,0]-octylthiolcarbamate,
b.p. (0.3 mm): 122°C, $n_D^{25}$: 1.5155.

If the appropriate secondary amines

, $R^1$ and $R^2$ having the above meanings, are reacted with carbon disulfide and a halide having the general formula $R^3$-Hal, $R^3$ having the above meanings and Hal denoting preferably bromine, chlorine and iodine, in accordance with a known process, the corresponding dithiolcarbamates are obtained, e.g., isopropyl-N-ethyl-N-bicyclo- 3,3,0-octyldithiolcarbamate having the formula

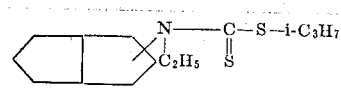

b.p. (0.25 mm): 140° – 146° C, $n_D^{25}$: 1.5721;
methyl-N-ethyl-N-bicyclo-[3,3,0]-octyldithiocarbamate,
b.p. (0.2 mm):142° – 148° C, $n_D^{25}$: 1.5905;
isopropyl-N-ethyl-N-tricyclo-[5,2,1,0$^{2,6}$]-decyldithiocarbamate,
b.p. (0.3 mm): 176° – 184° C, $n_D^{25}$: 1.5815;
ethyl-N-ethyl-N-bicyclo-[2,2,1]-heptyldithiocarbamate,
b.p. (0.4 mm): 154° – 156° C, $n_D^{25}$: 1.5864.

The herbicides according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons such as tetrahydronaphthalene, and alkylated naphthalenes may be used as spray liquids.

Aqueous formulations may be prepared from emulsion concentrates, pastes or wettable powders by adding water. To prepare emulsions the ingredients as such or dissolved in a so'vent may be homogenized in water or organic solvents by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The good herbicidal action of the compounds according to the invention is illustrated by the following examples.

EXAMPLE 1

In a greenhouse, loamy sandy soil is filled into pots having a diameter of 5 cm; the soil is then sown with Beta vulgaris, Spinacia oleraceo, Digitaria sanguinalis, Poa annua, Lolium perenne, Echinochloa crus-galli, Chenopodium album and Urtica urens.

The soil is subsequently treated with 2 kg per hectare of ethyl-N-ethyl-N-tricyclo-$[5,2,1,0^{2,6}]$-decylthiolcarbamate (III) and, for comparison, with 2 kg per hectare of ethyl-N-ethyl-N-cyclohexylthiolcarbamate (IV), these amounts of the active ingredients each being dispersed in 500 liters of water per hectare.

After 3 to 4 weeks it is observed that active ingredient III has a better herbicidal action than IV combined with the same good compatibility with Beta vulgaris and Spinacia oleracea.

The results of the experiment are given in the following table:

| Crop plants | Active ingredient III | IV |
|---|---|---|
| Beta vulgaris | 0 | 0 |
| Spinacia oleracea | 0 | 0 |
| Unwanted plants | | |
| Digitaria sanguinalis | 100 | 80 |
| Poa annua | 100 | 80 |
| Lolium perenne | 100 | 80 |
| Echinochloa crus-galli | 95 | 80 |
| Chenopodium album | 80 | 60 |
| Urtica urens | 80 | 65 |

0 = no damage; 100 = complete destruction.

EXAMPLE 2

An agricultural plot is sown with Beta vulgaris, Beta vulgaris var. sacch., Chenopodium album, Urtica urens, Echinochloa crus-galli, Lolium multiflorum, Alopecurus myosuroides and Avena fatua.

The soil prepared in this manner is then immediately treated with 15 kg per hectare of ethyl-N-ethyl-N-bicyclo- 2,2,1 -heptylthiolcarbamate (II) and, for comparison, with 15 kg per hectare of ethyl-N-ethyl-N-cyclohexylthiolcarbamate (IV), these amounts of the active ingredients each being dispersed in 500 liters of water per hectare.

After 4 weeks it is observed that active ingredient II has the same good compatibility with Beta vulgaris and Beta vulgaris var. sacch. as IV and a herbicidal action on unwanted plants far superior to that of IV.

The results of the experiment are given in the following table:

| Crop plants | Active ingredient II | IV |
|---|---|---|
| Beta vulgaris | 0 | 0 |
| Beta vulgaris var.sacch. | 0 | 0 |
| Unwanted plants | | |
| Chenopodium album | 95 | 50 |
| Urtica urens | 100 | 60 |
| Echinochloa crus-galli | 100 | 70 |
| Lolium multiflorum | 100 | 85 |
| Alopecurus myosuroides | 100 | 80 |
| Avena fatua | 80 | 40 |

0 = no damage; 100 = complete destruction.

EXAMPLE 3

In a greenhouse, loamy sandy soil is filled into pots and sown with Beta vulgaris, Spinacia oleracea, Zea mays, Gossypium hirsutum, Soja hispida, Digitaria sanguinalis, Echinochloa crus-galli, Poa annua, Poa trivialis, Avena fatua and Chenopodium album. The soil prepared in this manner is subsequently treated with 2 kg per hectare of each of the following active ingredients, each amount being dispersed or emulsified in 500 liters of water per hectare: A isopropyl-N-ethyl-N-bicyclo-[3,3,0]- octylthiolcarbamate B propyl-N-ethyl-N-bicyclo-[3,3,0]-octylthiolcarbamate C ethyl-N-ethyl-N-bicyclo-[3,3,0]-octylthiolcarbamate D methyl-N-ethyl-N-bicyclo-[3,3,0]-octylthiolcarbamate.

After 3 to 4 weeks the results given below are obtained:

| | Active ingredient | | | |
|---|---|---|---|---|
| | A | B | C | D |
| Beta vulgaris | 0 | 0 | 0 | 0 |
| Spinacia oleracea | 0 | 0 | 0 | 0 |
| Zea mays | 5 | 0 | 0 | 0 |
| Gossypium hirsutum | 5 | 0 | 0 | 0 |
| Soja hispida | 0 | 0 | 0 | 0 |
| Digitaris sanguinalis | 100 | 100 | 100 | 95 |
| Echinochloa crus-galli | 100 | 100 | 100 | 100 |
| Poa annua | 100 | 100 | 100 | 100 |
| Poa trivialis | 100 | 100 | 100 | 100 |
| Avena fatua | 85 | 90 | 100 | 80 |
| Chenopodium album | 80 | 80 | 85 | 75 |

0 = no damage; 100 = complete destruction.

EXAMPLE 4

In a greenhouse the plants Beta vulgaris, Poa annua, Avena fatua and Echinochloa crus-galli are treated at a growth height of 3 to 15 cm with 2 kg per hectare of each of the following active ingredients, each amount being emulsified or dispersed in 500 liters of water per hectare:

A isopropyl-N-ethyl-N-bicyclo-[3,3,0]-octylthiolcarbamate

B propyl-N-ethyl-N-bicyclo-[3,3,0]-octylthiolcarbamate

C ethyl-N-ethyl-N-bicyclo-[3,3,0]-octylthiolcarbamate

D methyl-N-ethyl-N-bicyclo-[3,3,0]-octylthiolcarbamate

E ethyl-N-ethyl-N-tricyclo-$[5,2,1,0^{2,6}]$-decylthiolcarbamate

F ethyl-N-ethyl-N-bicyclo-[2,2,1]-heptylthiolcarbamate.

After 3 to 4 weeks the results given below are obtained:

| | Active ingredient | | | | | |
|---|---|---|---|---|---|---|
| | A | B | C | D | E | F |
| Beta vulgaris | 5 | 0 | 0 | 0 | 0 | 0 |
| Poa annus | 80 | 80 | 85 | 70 | 70 | 75 |
| Avena fatua | 90 | 90 | 90 | 70 | 65 | 70 |

0 = no damage; 100 = complete destruction.

EXAMPLE 5

70 parts by weight of compound III from Example 1 is mixed with 30 parts by weight of N-methyl-α-pyrrolidone. A mixture is obtained which is suitable for application in the form of very fine drops.

EXAMPLE 6

20 parts by weight of compound II from Example 2 is dissolved in a mixture consisting of 80 parts by weight of xylene, 10 parts by weight of the adduct of 8 to 10 moles of ethylene oxide to 1 mole of oleic acid-N-monoethanolamine, 5 parts by weight of the cylcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

20 parts by weight of compound A from Example 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of compound B from Example 3 is dissolved in a mixture consisting of 25 parts by weight of cyclohexanol, 65 parts by weight of a mineral oil fraction having a boiling point between 210° and 280° C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

20 parts by weight of compound C from Example 3 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 10

3 parts by weight of compound D from Example 3 is intimately mixed with 97 parts by weight of particular kaolin. A dust is obtained containing 3 percent by weight of the active ingredient.

EXAMPLE 11

30 parts by weight of compound E from Example 4 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A thiolcarbamate of the formula

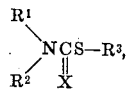

where $R^1$ denotes lower alkyl, $R^2$ denotes bicycloalkyl, tricycloalkyl or tetracycloalkyl having seven to 12 carbon atoms, $R^3$ denotes lower alkyl which may be substituted by chlorine or lower alkenyl which may be substituted by chlorine, and X denotes oxygen or sulfur.

2. Ethyl-N-ethyl-N-tricyclo-[5,2,1,0$^{2,6}$]-decylthiolcarbamate.

3. Ethyl-N-ethyl-N-bicyclo-[2,2,1]-heptylthiolcarbamate.

4. Isopropyl-N-ethyl-N-bicyclo-[3,3,0]-octylthiolcarbamate.

5. Propyl-N-ethyl-N-bicyclo-[3,3,0]-octylthiolcarbamate.

6. Ethyl-N-ethyl-N-bicyclo-[3,3,0]-octylthiolcarbamate.

7. Methyl-N-ethyl-N-bicyclo-[3,3,0]-octylthiolcarbamate.

8. Ethyl-N-ethyl-N-tricyclo-[5,2,1,0$^{2,6}$]-decylthiolcarbamate.

9. Ethyl-N-ethyl-N-bicyclo-[2,2,1]-heptylthiolcarbamate.

* * * * *